(12) United States Patent
Gou

(10) Patent No.: US 7,127,595 B1
(45) Date of Patent: Oct. 24, 2006

(54) METHOD AND SYSTEM FOR CONFIGURING TO A DESIRED ORDER THE ORDER OF A DATA ARRAY

(75) Inventor: Dayin Gou, San Jose, CA (US)

(73) Assignee: Promos Technologies, Inc., Hsin-Chu (TW)

( * ) Notice: Subject to any disclaimer, the term of this patent is extended or adjusted under 35 U.S.C. 154(b) by 0 days.

(21) Appl. No.: 09/505,414

(22) Filed: Feb. 16, 2000

(51) Int. Cl.
*G06F 7/24* (2006.01)
(52) U.S. Cl. ...................................... 712/300
(58) Field of Classification Search ................. 712/300
See application file for complete search history.

(56) References Cited

U.S. PATENT DOCUMENTS

| | | | | | |
|---|---|---|---|---|---|
| 4,916,649 | A | * | 4/1990 | Yorozu et al. | 708/404 |
| 5,594,919 | A | * | 1/1997 | Turkowski | 712/300 |
| 5,721,957 | A | * | 2/1998 | Huang et al. | 710/66 |
| 5,819,117 | A | * | 10/1998 | Hansen | 712/300 |
| 5,822,619 | A | * | 10/1998 | Sidwell | 712/300 |
| 6,006,245 | A | * | 12/1999 | Thayer | 708/404 |

OTHER PUBLICATIONS

Preiss, Bruno P. and Eng, P. "Quicksort". © 1998 http://www.brpreiss.com/books/opus5/html/page490.html pp. 1-3.*
"Lecture 5—quicksort". © 1997 http://www.cs.sunysb.edu/~algorith/lectures-good/node5.html.*
Dankel, Douglas D. II. "Quicksort Algorithm". © 1997 http://www.cise.ufl.edu/—ddd/cis3020/summer-97/lectures/lec17/ Slides 1-31.*
Chen, Alice Xin. "Data Structure & Sorting". © Feb. 9, 2000 http://www.cas.mcmaster.ca/~terlaky/4-6TD3/slides/alice/sorting2.pdf Slides 1-26.*

* cited by examiner

*Primary Examiner*—Eddie Chan
*Assistant Examiner*—Aimee J. Li
(74) *Attorney, Agent, or Firm*—Sawyer Law Group LLP

(57) ABSTRACT

A method and system of configuring an array of data is disclosed. The method and system comprise generating an array of data an order and reconfiguring the array of data into a plurality sub arrays of data, the plurality of sub arrays of data being in a desired order. By utilizing the method and system in accordance with the present invention, a converted data array can be processed in a parallel fashion thereby increasing the overall processing speed of the computer system. The present invention has particular utility when converting data either from a bit reverse order to a natural order or from a natural order to a bit reverse order. In accordance with the present invention, the array of data is reconfigured utilizing a swap operation to allow for conversion of the data array from either a bit reverse order to a natural order or from a natural order to a bit reversed order.

9 Claims, 14 Drawing Sheets

| 1 | 2 | 3 | 4 | 5 |
|---|---|---|---|---|
| value for each item | index in decimal and hexdecimal | index in binary | bit-reverse index in binary | bit-reverse index in decimal and hexdecimal |
| 95 | 0 (0) | 0000 | 0000 | 0 (0) |
| 23 | 1 (1) | 0001 | 1000 | 8 (8) |
| 60 | 2 (2) | 0010 | 0100 | 4 (4) |
| 48 | 3 (3) | 0011 | 1100 | 12 (c) |
| 89 | 4 (4) | 0100 | 0010 | 2 (2) |
| 76 | 5 (5) | 0101 | 1010 | 10 (a) |
| 45 | 6 (6) | 0110 | 0110 | 6 (6) |
| 1 | 7 (7) | 0111 | 1110 | 14 (e) |
| 82 | 8 (8) | 1000 | 0001 | 1 (1) |
| 44 | 9 (9) | 1001 | 1001 | 9 (9) |
| 61 | 10 (a) | 1010 | 0101 | 5 (5) |
| 79 | 11 (b) | 1011 | 1101 | 13 (d) |
| 92 | 12 (c) | 1100 | 0011 | 3 (3) |
| 73 | 13 (d) | 1101 | 1011 | 11 (b) |
| 17 | 14 (e) | 1110 | 0111 | 7 (7) |
| 40 | 15 (f) | 1111 | 1111 | 15 (f) |

FIG.2 (PRIOR ART)  20

|  | 1 | 2 | 5 |
|---|---|---|---|
|  | value for each item X | index in decimal and hexdecimal | bit-reverse index in decimal and hexdecimal |
| Line 0 | 95 | 0 (0) | 0 (0) |
| Line 1 | 23 | 1 (1) | 8 (8) |
| Line 2 | 60 | 2 (2) | 4 (4) |
| Line 3 | 48 | 3 (3) | 12 (c) |
| Line 4 | 89 | 4 (4) | 2 (2) |
| Line 5 | 76 | 5 (5) | 10 (a) |
| Line 6 | 45 | 6 (6) | 6 (6) |
| Line 7 | 1 | 7 (7) | 14 (e) |
| Line 8 | 82 | 8 (8) | 1 (1) |
| Line 9 | 44 | 9 (9) | 9 (9) |
| Line 10 | 61 | 10 (a) | 5 (5) |
| Line 11 | 79 | 11 (b) | 13 (d) |
| Line 12 | 92 | 12 (c) | 3 (3) |
| Line 13 | 73 | 13 (d) | 11 (b) |
| Line 14 | 17 | 14 (e) | 7 (7) |
| Line 15 | 40 | 15 (f) | 15 (f) |

FIG.3
(PRIOR ART)

| |
|---|
| step 0: y[0] = x[0] = 95 |
| step 1: y[1] = x[8] = 82 |
| step 2: y[2] = x[4] = 89 |
| step 3: y[3] = x[12] = 92 |
| step 4: y[4] = x[2] = 60 |
| step 5: y[5] = x[10] = 61 |
| step 6: y[6] = x[6] = 45 |
| step 7: y[7] = x[14] = 17 |
| step 8: y[8] = x[1] = 23 |
| step 9: y[9] = x[9] = 44 |
| step 10: y[10] = x[5] = 76 |
| step 11: y[11] = x[13] = 73 |
| step 12: y[12] = x[3] = 48 |
| step 13: y[13] = x[11] = 79 |
| step 14: y[14] = x[7] = 1 |
| step 15: y[15] = x[15] = 40 |

FIG.3A
(PRIOR ART)

Example 1

For the data array:   120

| a0, a1, a2, a3, a4, a5, a6, a7 | a8, a9, a10, a11, a12, a13, a14, a15 |
|---|---|
| b0, b1, b2, b3, b4, b5, b6, b7 | b8, b9, b10, b11, b12, b13, b14, b15 |

A swap instruction comprising unitsize=8 and write pattern=L1H0 generates the following swap operation:   130

| a0, a1, a2, a3, a4, a5, a6, a7 | a8, a9, a10, a11, a12, a13, a14, a15 |
|---|---|
| b0, b1, b2, b3, b4, b5, b6, b7 | b8, b9, b10, b11, b12, b13, b14, b15 |

Thereby creating the following array:   140

| a0, a1, a2, a3, a4, a5, a6, a7 | b0, b1, b2, b3, b4, b5, b6, b7 |
|---|---|
| a8, a9, a10, a11, a12, a13, a14, a15 | b8, b9, b10, b11, b12, b13, b14, b15 |

Example 2

For the data array:   150

| a0, a1, a2, a3, a4, a5, a6, a7 | a8, a9, a10, a11, a12, a13, a14, a15 |
|---|---|
| b0, b1, b2, b3, b4, b5, b6, b7 | b8, b9, b10, b11, b12, b13, b14, b15 |

A swap instruction comprising unitsize=4 and write pattern=L1H1 generates the following swap operation:   160

| a0, a1, a2, a3, | a4, a5, a6, a7, | a8, a9, a10, a11, | a12, a13, a14, a15 |
|---|---|---|---|
| b0, b1, b2, b3, | b4, b5, b6, b7, | b8, b9, b10, b11, | b12, b13, b14, b15 |

Thereby creating the following array:   170

| b4, b5, b6, b7, | b0, b1, b2, b3, | b12, b13, b14, b15 | b8, b9, b10, b11, |
|---|---|---|---|
| a4, a5, a6, a7, | a0, a1, a2, a3, | a12, a13, a14, a15 | a8, a9, a10, a11, |

FIG.7

95, 23, 60, 48, 89, 76, 45, 1, 82, 44, 61, 79, 92, 73, 17, 40,
93, 91, 41, 89, 5, 35, 81, 0, 13, 20, 19, 60, 27, 19, 3, 74, 32-item data array

Step 300 swap with unit-size=8 and write-pattern=L1H0 before

| 92, 23, 60, 48, 89, 76, 45, 1, | 82, 44, 61, 79, 92, 73, 17, 40, |
|---|---|
| 93, 91, 41, 89, 5, 35, 81, 0, | 13, 20, 19, 60, 27, 19, 3, 74, | after

| 95, 23, 60, 48, 89, 76, 45, 1, | 93, 91, 41, 89, 5, 35, 81, 0, |
|---|---|
| 82, 44, 61, 79, 92, 73, 17, 40, | 13, 20, 19, 60, 27, 19, 3, 74, | swap with unit-size=4 and write-pattern=L1H0 before

| 95, 23, 60, 48, | 89, 76, 45, 1, | 93, 91, 41, 89, | 5, 35, 81, 0, |
|---|---|---|---|
| 82, 44, 61, 79, | 92, 73, 17, 40, | 13, 20, 19, 60, | 27, 19, 3, 74, | after

| 95, 23, 60, 48, | 82, 44, 61, 79, | 93, 91, 41, 89, | 13, 20, 19, 60, |
|---|---|---|---|
| 89, 76, 45, 1, | 92, 73, 17, 40, | 5, 35, 81, 0, | 27, 19, 3, 74, | swap with unit-size=2 and write-pattern=L1H0 before

| 95, 23, | 60, 48, | 82, 44, | 61, 79, | 93, 91, | 41, 89, | 13, 20, | 19, 60, |
|---|---|---|---|---|---|---|---|
| 89, 76, | 45, 1, | 92, 73, | 17, 40, | 5, 35, | 81, 0, | 27, 19, | 3, 74, | after

| 95, 23, | 89, 76, | 82, 44, | 92, 73, | 93, 91, | 5, 35, | 13, 20, | 27, 19, |
|---|---|---|---|---|---|---|---|
| 60, 48, | 45, 1, | 61, 79, | 17, 40, | 41, 89, | 81, 0, | 19, 60, | 3, 74, | swap with unit-size=1 and write-pattern=L1H0 before

| 95 | 23 | 89 | 76 | 82 | 44 | 92 | 73 | 93 | 91 | 5 | 35 | 13 | 20 | 27 | 19 |
|---|---|---|---|---|---|---|---|---|---|---|---|---|---|---|---|
| 60 | 48 | 45 | 1 | 61 | 79 | 17 | 40 | 41 | 89 | 81 | 0 | 19 | 60 | 3 | 74 | after

| 95 | 60 | 89 | 45 | 82 | 61 | 92 | 17 | 93 | 41 | 5 | 81 | 13 | 19 | 27 | 3 |
|---|---|---|---|---|---|---|---|---|---|---|---|---|---|---|---|
| 23 | 48 | 76 | 1 | 44 | 79 | 73 | 40 | 91 | 89 | 35 | 0 | 20 | 60 | 19 | 74 |

FIG.9(C)  Step 302 swap with unit-size=8 and write-pattern=L1H0 before

| 95, 60, 89, 45, 82, 61, 92, 17 | 93, 41, 5, 81, 13, 19, 27, 3 |
|---|---|
| 23, 48, 76, 1, 44, 79, 73, 40 | 91, 89, 35, 0, 20, 60, 19, 74 | after

| 95, 60, 89, 45, 82, 61, 92, 17, | 23, 48, 76, 1, 44, 79, 73, 40, |
|---|---|
| 93, 41, 5, 81, 13, 19, 27, 3, | 91, 89, 35, 0, 20, 60, 19, 74, | swap with unit-size=4 and write-pattern=L1H0 before

| 95, 60, 89, 45, | 82, 61, 92, 17, | 23, 48, 76, 1, | 44, 79, 73, 40, |
|---|---|---|---|
| 93, 41, 5, 81, | 13, 19, 27, 3, | 91, 89, 35, 0, | 20, 60, 19, 74, | after

| 95, 60, 89, 45, | 93, 41, 5, 81, | 23, 48, 76, 1, | 91, 89, 35, 0, |
|---|---|---|---|
| 82, 61, 92, 17, | 13, 19, 27, 3, | 44, 79, 73, 40, | 20, 60, 19, 74, | swap with unit-size=2 and write-pattern=L1H0 before

| 95, 60, | 89, 45, | 93, 41, | 5, 81, | 23, 48, | 76, 1, | 91, 89, | 35, 0, |
|---|---|---|---|---|---|---|---|
| 82, 61, | 92, 17, | 13, 19, | 27, 3, | 44, 79, | 73, 40, | 20, 60, | 19, 74, | after

| 95, 60, | 82, 61, | 93, 41, | 13, 19, | 23, 48, | 44, 79, | 91, 89, | 20, 60, |
|---|---|---|---|---|---|---|---|
| 89, 45, | 92, 17, | 5, 81, | 27, 3, | 76, 1, | 73, 40, | 35, 0, | 19, 74, | swap with unit-size=1 and write-pattern=L1H0 before

| 95 | 60 | 82 | 61 | 93 | 41 | 13 | 19 | 23 | 48 | 44 | 79 | 91 | 89 | 20 | 60 |
|---|---|---|---|---|---|---|---|---|---|---|---|---|---|---|---|
| 89 | 45 | 92 | 17 | 5 | 81 | 27 | 3 | 76 | 1 | 73 | 40 | 35 | 0 | 19 | 74 | after

| 95 | 89 | 82 | 92 | 93 | 5 | 13 | 27 | 23 | 76 | 44 | 73 | 91 | 35 | 20 | 19 |
|---|---|---|---|---|---|---|---|---|---|---|---|---|---|---|---|
| 60 | 45 | 61 | 17 | 41 | 81 | 19 | 3 | 48 | 1 | 79 | 40 | 89 | 0 | 60 | 74 | swap with unit-size=8 and write-pattern=L1H0 before

| 95, 89, 82, 92, 93, 5, 13, 27, | 23, 76, 44, 73, 91, 35, 20, 19, |
|---|---|
| 60, 45, 61, 17, 41, 81, 19, 3 | 48, 1, 79, 40, 89, 0, 60, 74 | after

| 95, 89, 82, 92, 93, 5, 13, 27, | 60, 45, 61, 17, 41, 81, 19, 3 |
|---|---|
| 23, 76, 44, 73, 91, 35, 20, 19, | 48, 1, 79, 40, 89, 0, 60, 74 |

FIG.9(D)

Step 304 swap with unit-size=4 and write-pattern=L1H0 before

| 95, 89, 82, 92, | 93, 5, 13, 27, | 60, 45, 61, 17, | 41, 81, 19, 3, |
|---|---|---|---|
| 23, 76, 44, 73, | 91, 35, 20, 19, | 48, 1, 79, 40, | 89, 0, 60, 74, | after

| 95, 89, 82, 92, | 23, 76, 44, 73, | 60, 45, 61, 17, | 48, 1, 79, 40, |
|---|---|---|---|
| 93, 5, 13, 27, | 91, 35, 20, 19, | 41, 81, 19, 3, | 89, 0, 60, 74, | swap with unit-size=2 and write-pattern=L1H0 before

| 95, 89, | 82, 92, | 23, 76, | 44, 73, | 60, 45, | 61, 17, | 48, 1, | 79, 40, |
|---|---|---|---|---|---|---|---|
| 93, 5, | 13, 27, | 91, 35, | 20, 19, | 41, 81, | 19, 3, | 89, 0, | 60, 74, | after

| 95, 89, | 93, 5, | 23, 76, | 91, 35, | 60, 45, | 41, 81, | 48, 1, | 89, 0, |
|---|---|---|---|---|---|---|---|
| 82, 92, | 13, 27, | 44, 73, | 20, 19, | 61, 17, | 19, 3, | 79, 40, | 60, 74, | swap with unit-size=1 and write-pattern=L1H0 before

| 95, | 89, | 93, | 5, | 23, | 76, | 91, | 35, | 60, | 45, | 41, | 81, | 48, | 1, | 89, | 0, |
|---|---|---|---|---|---|---|---|---|---|---|---|---|---|---|---|
| 82, | 92, | 13, | 27, | 44, | 73, | 20, | 19, | 61, | 17, | 19, | 3, | 79, | 40, | 60, | 74, | after

| 95, | 82, | 91, | 13, | 23, | 44, | 91, | 20, | 60, | 61, | 41, | 19, | 48, | 79, | 89, | 60, |
|---|---|---|---|---|---|---|---|---|---|---|---|---|---|---|---|
| 89, | 92, | 5, | 27, | 76, | 73, | 35, | 19, | 45, | 17, | 81, | 3, | 1, | 40, | 0, | 74, | swap with unit-size=4 and write-pattern=L1H0 before

| 95, 82, 93, 13, | 23, 44, 91, 20, | 60, 61, 41, 19, | 48, 79, 89, 60, |
|---|---|---|---|
| 89, 92, 5, 27, | 76, 73, 35, 19, | 45, 17, 81, 3, | 1, 40, 0, 74, | after

| 95, 82, 93, 13, | 89, 92, 5, 27, | 60, 61, 41, 19, | 45, 17, 81, 3 |
|---|---|---|---|
| 23, 44, 91, 20, | 76, 73, 35, 19, | 44, 79, 89, 60 | 1, 40, 0, 74, |

FIG.9(E)

Step 306 swap with unit-size=2 and write-pattern=L1H0 before

| 95, 82, | 93, 13, | 89, 92, | 5, 27, | 60, 61, | 41, 19, | 45, 17, | 81, 3, |
|---|---|---|---|---|---|---|---|
| 23, 44, | 91, 20, | 76, 73, | 35, 19, | 48, 79, | 89, 60, | 1, 40, | 0, 74, | after

| 95, 82, | 23, 44, | 89, 92, | 76, 73, | 60, 61, | 48, 79, | 45, 17 | 1, 40, |
|---|---|---|---|---|---|---|---|
| 93, 13, | 91, 20, | 5, 27, | 35, 19, | 41, 19, | 89, 60, | 81, 3, | 0, 74, | swap with unit-size=1 and write-pattern=L1H0 before

| 95 | 82 | 23 | 44 | 89 | 92 | 76 | 73 | 60 | 61 | 48 | 79 | 45 | 17 | 1 | 40 |
|---|---|---|---|---|---|---|---|---|---|---|---|---|---|---|---|
| 93 | 13 | 91 | 20 | 5 | 27 | 35 | 19 | 41 | 19 | 89 | 60 | 81 | 3 | 0 | 74 | after

| 95 | 93 | 23 | 91 | 89 | 5 | 76 | 35 | 60 | 41 | 48 | 89 | 45 | 81 | 1 | 0 |
|---|---|---|---|---|---|---|---|---|---|---|---|---|---|---|---|
| 82 | 13 | 44 | 20 | 92 | 27 | 73 | 19 | 61 | 19 | 79 | 60 | 17 | 3 | 4 | 74 | swap with unit-size=2 and write-pattern=L1H0 before

| 95, 93, | 23, 91, | 89, 5, | 76, 35, | 60, 41, | 48, 89, | 45, 81, | 1, 0, |
|---|---|---|---|---|---|---|---|
| 82, 13, | 44, 20, | 92, 27, | 73, 19, | 61, 19, | 79, 60, | 17, 3, | 4, 74, | after

| 95, 93, | 82, 13, | 89, 5, | 92, 27, | 60, 41, | 61, 19, | 45, 81, | 17, 3, |
|---|---|---|---|---|---|---|---|
| 23, 91, | 44, 20, | 76, 35, | 73, 19, | 48, 89, | 79, 60, | 1, 0, | 4, 74, |

METHOD AND SYSTEM FOR CONFIGURING TO A DESIRED ORDER THE ORDER OF A DATA ARRAY

FIELD OF THE INVENTION

The present invention relates generally to processing data in a computer system and specifically to a method and system for converting the order of a data array.

BACKGROUND OF THE INVENTION

Fast Fourier Transform (FFT) and inverse transform (IFFT) algorithms are frequently used in Digital Signal Processing and multimedia applications such as digital audio encoding and decoding. Implementation of FFT/IFFT algorithms can be performed on large mainframe computers or on smaller personal computers. Once the FFT/IFFT algorithm is completed, the data array produced by the algorithm is either in a bit reverse order or a natural order. Typically, the input data is in natural order, so the output will be in bit-reverse order. However, it is desirable that the data be converted to natural order for subsequent processes.

In a conventional scalar processing system, this conversion is completed by using a look-up table. A look-up table is a translation table that translates the bit reverse order-data array into a natural order-data array by "looking up" the index-mapping information in a table. FIG. 1 is a flowchart of the operation of a conventional scalar processing system. First, an FFT/IFFT algorithm generates a data array in bit reverse order, via step 10. Next, look up tables are utilized to convert the set of data from bit reverse order to natural order, via step 12. This is an extremely time consuming process however, because every item of data in the data array must be addressed and accessed separately and individually by the scalar processing system.

To better understand the conventional methodology, please refer to FIG. 2. FIG. 2 is a data array 20 with $N=2^M$ items populated in it. In this example, N=16. Please observe the relationship between column 3 (index in binary) and column 4 (bit-reverse index in binary) wherein if an item from column 3 is read from right to left, it is identical to the item in column 4. That is, column 4 is the bit-reverse index of column 3.

Please refer now to FIG. 3. FIG. 3 is a look-up table comprising columns 1, 2, and 5 of the data array 20 of FIG. 2. In order to subsequently convert the data items (column 1) from bit-reverse order (column 5) to natural order (column 2), each data item in the data array 20 is addressed and accessed separately by the scalar processing system. FIG. 3(a) illustrates the required steps of the conventional conversion method. For example, in step 0, element 0(0) of column 2 is matched with element 0(0) of column 5. Accordingly, element 0(0) of column 5 is located at Line 0 and the corresponding data item (95) is recorded; in step 1, element 1(1) of column 2 is matched with element 1(1) of column 5. Here, element 1(1) of column 5 is located at Line 8 and the corresponding data item (82) is recorded; etc. Thus, the natural order 95, 82, 89, 92, 60, 61, 45, 17, 23, 44, 76, 73, 48, 79, 1, 40 is established. However, because each data item in the data array is addressed and accessed separately by the scalar processing system, this is a very time consuming process. Furthermore, this conventional process requires excess utilization of scratch memory.

Accordingly, what is needed is a more efficient way of converting a data array from bit reverse order to natural order. The present invention addresses such a need.

SUMMARY OF THE INVENTION

A method and system of configuring an array of data is disclosed. The method and system comprise generating an array of data in an order and reconfiguring the array of data into a plurality sub arrays of data, the plurality of sub arrays of data being in a desired order.

By utilizing the method and system in accordance with the present invention, a converted data array can be processed in a parallel fashion thereby increasing the overall processing speed of the computer system. The present invention has particular utility when converting data either from a bit reverse order to a natural order or from a natural order to a bit reverse order. In accordance with the present invention, the array of data is reconfigured utilizing a swap operation to allow for conversion of the data array from either a bit reverse order to a natural order or from a natural order to a bit reversed order.

BRIEF DESCRIPTION OF THE DRAWINGS

FIG. 2 is an illustration of a typical data array.

FIG. 3 shows a typical look-up table.

FIG. 3(a) illustrates the required steps of the conventional conversion method.

FIG. 7 shows 2 examples of the operation of the swap instruction in accordance with the present invention.

FIGS. 9(a–f) illustrate the operation of a preferred embodiment of the method in accordance with the present invention.

DETAILED DESCRIPTION

The present invention relates to processing data in a computer system. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The method and system in accordance with the present invention is disclosed in the context of a preferred embodiment. The preferred embodiment of the present invention is directed towards a method and system for converting a data array from a bit reverse order to a natural order. Through the use of a method and system in accordance with the present invention, the conversion of the data array from bit reverse order to natural order is accomplished via a swapping algorithm. By utilizing the method in accordance with the present invention, the converted data array can be processed in a parallel fashion thereby increasing the overall processing speed of the computer system.

Figure 1:
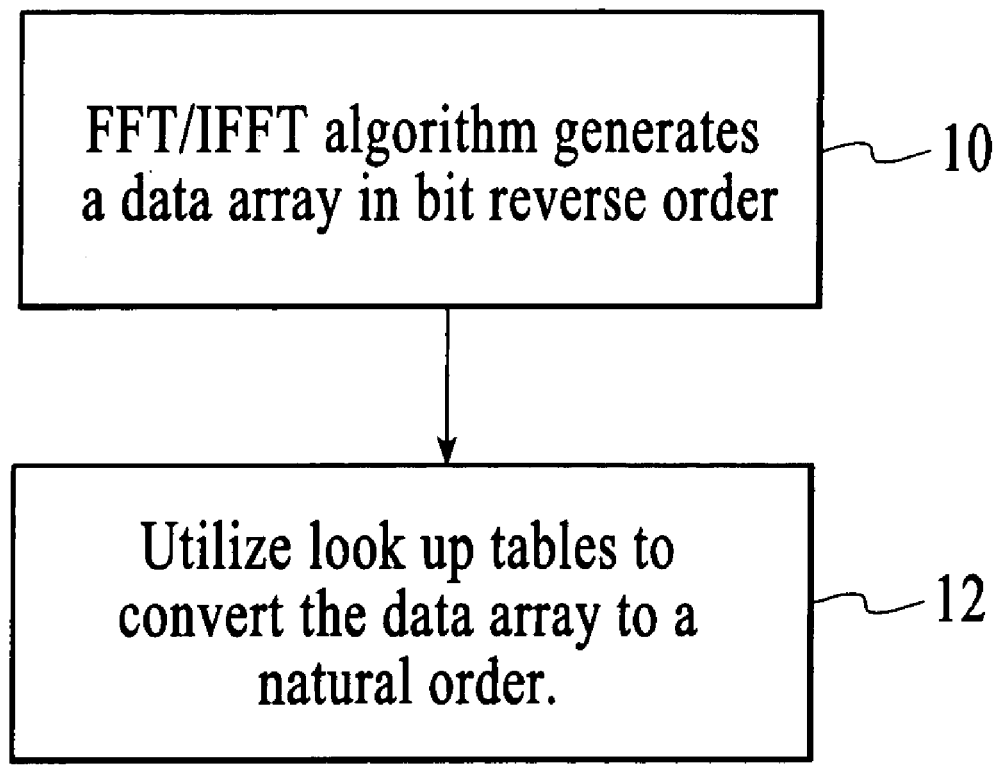
FIG. 1 is a flowchart of the operation of a conventional scalar processing system.
Figure 4:
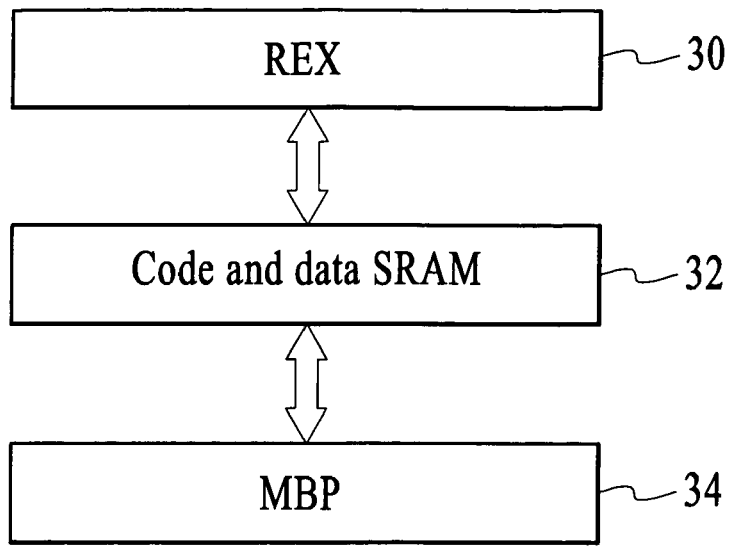
FIG. 4 shows the macro block processing configuration.

The method and system in accordance with the present invention utilizes computation modules to process data in multimedia applications. Each computation module comprises a RISC Extension (REX) and a macro block processor (MBP). In addition, the embedded firmware comprises a cycle-intensive computation code coded in assembly language for execution by the MBP and a control code that is coded in C language for execution by the REX. FIG. 4 shows how the MBP 34 interfaces with the REX 30 via the static random access memory (SRAM) code and data 32. Preferably, the MBP is a vector processor.

Figure 5:
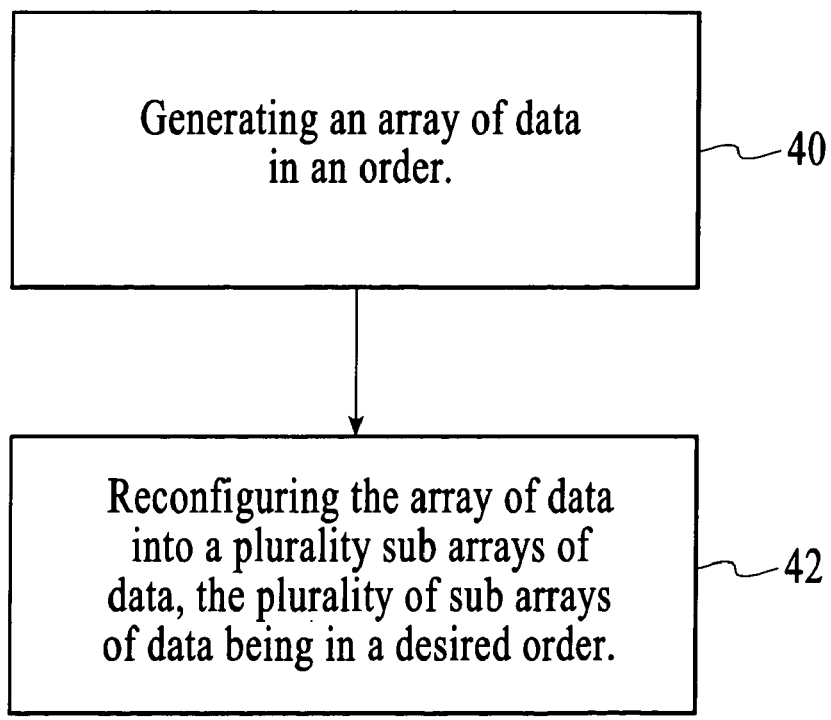
FIG. 5 is a flowchart of the method in accordance with the present invention.

To more particularly describe the method in accordance with the present invention, FIG. 5 is a flowchart of the method in accordance with the present invention. First, an array of data is generated in a predetermined order, via step 40. Next, the array of data is reconfigured into a plurality of sub arrays of data, the plurality of sub arrays of data being in a desired order, via step 42. Preferably the reconfiguring step comprises a swap operation that recursively converts the array of data from a bit reverse order to a natural order.

Figure 6:
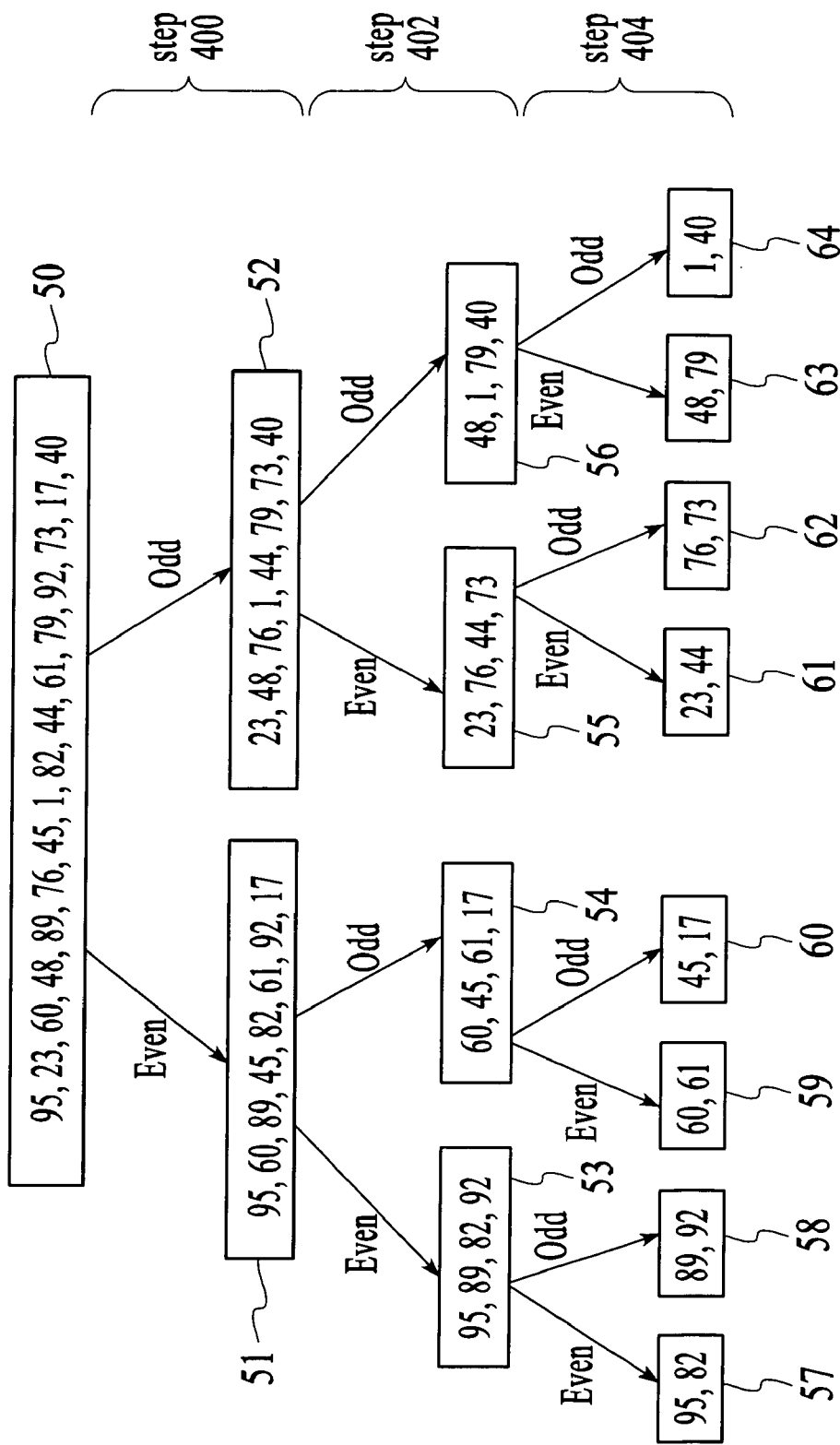
FIG. 6 illustrates the recursive conversion of a data array.

To better understand how a data array is recursively converted from one order to a different order, please refer to FIG. 6. The data array 50 is initially split into two 8-item sub arrays, one array 51 comprising the even indexed items and the other array 52 comprising the odd indexed items. Each of the arrays 51, 52 is then split into two 4-item sub arrays 53, 54, 55, 56 wherein arrays 53 and 55 comprise the respective even indexed items of arrays 51 and 52 and arrays 54 and 56 comprise the respective odd indexed items of arrays 51 and 52. Finally, each of the arrays 53–56 are split into two 2-item sub arrays 57–64 wherein arrays 57, 59, 61 and 63 comprise the respective even indexed items of arrays 53–56 and arrays 58, 60, 62 and 64 comprise the respective odd indexed items of arrays 53–56.

In order to accomplish the recursive conversion of a data array, the method and system in accordance with the present invention utilizes a swap instruction to implement a swapping operation that recursively converts a data array from one order to another predetermined order. In macro block processing, every consecutive 16 bytes (items) of SRAM data is termed as an 'entry'. Accordingly, for data arrays comprising more than 16 bytes (i.e. 32, 64, etc.), the swap instruction operates on every two entries of data items based on a "unit-size" designation and a "write-pattern". For example, a data array comprising 64 items has 4 entries. Consequently, the swap instruction operates on two groups of entries wherein each group comprises two entries. The unit-size determines how the swap instruction will handle the entries and can assume one of five values: 16, 8, 4, 2, and 1. When the unit size is 16, all 16 bytes in an entry are regarded as a whole. However, when the unit-size is 8, the 16 bytes are treated as two units, when the unit-size is 4 the 16 bytes are treated as 4 units, etc.

The write pattern determines the unit destinations (i.e., which units will be swapped) and has the form LxHy wherein x and y assume a value of 0 or 1. The "L" term refers to a Low portion of a data array and the "H" term refers to a High portion of a data array. A value of 1 means that a new value will overwrite an old value, while a value of 0 means that the value will not be swapped. Please refer to FIG. 7 for two examples of the operation of the swap instruction. In example 1, for the data array 120, a swap instruction comprising unitsize=8 and a write pattern L1H0 generates the swap operation 130, which establishes the new data array 140. In example 2, for the data array 150, a swap instruction comprising unitsize=4 and a write pattern L1H1 generates the swap operation 160, which establishes the new data array 170.

It should be noted that the above outlined description of the swap instruction, refers to data items which are 1 byte in length. However, it would be readily apparent to one of ordinary skill in the art that multi-byte data in the "little endian" type configuration, the "big endian" type configuration, or any other of a variety of configurations could be implemented while remaining within the spirit and scope of the present invention.

Figure 8:
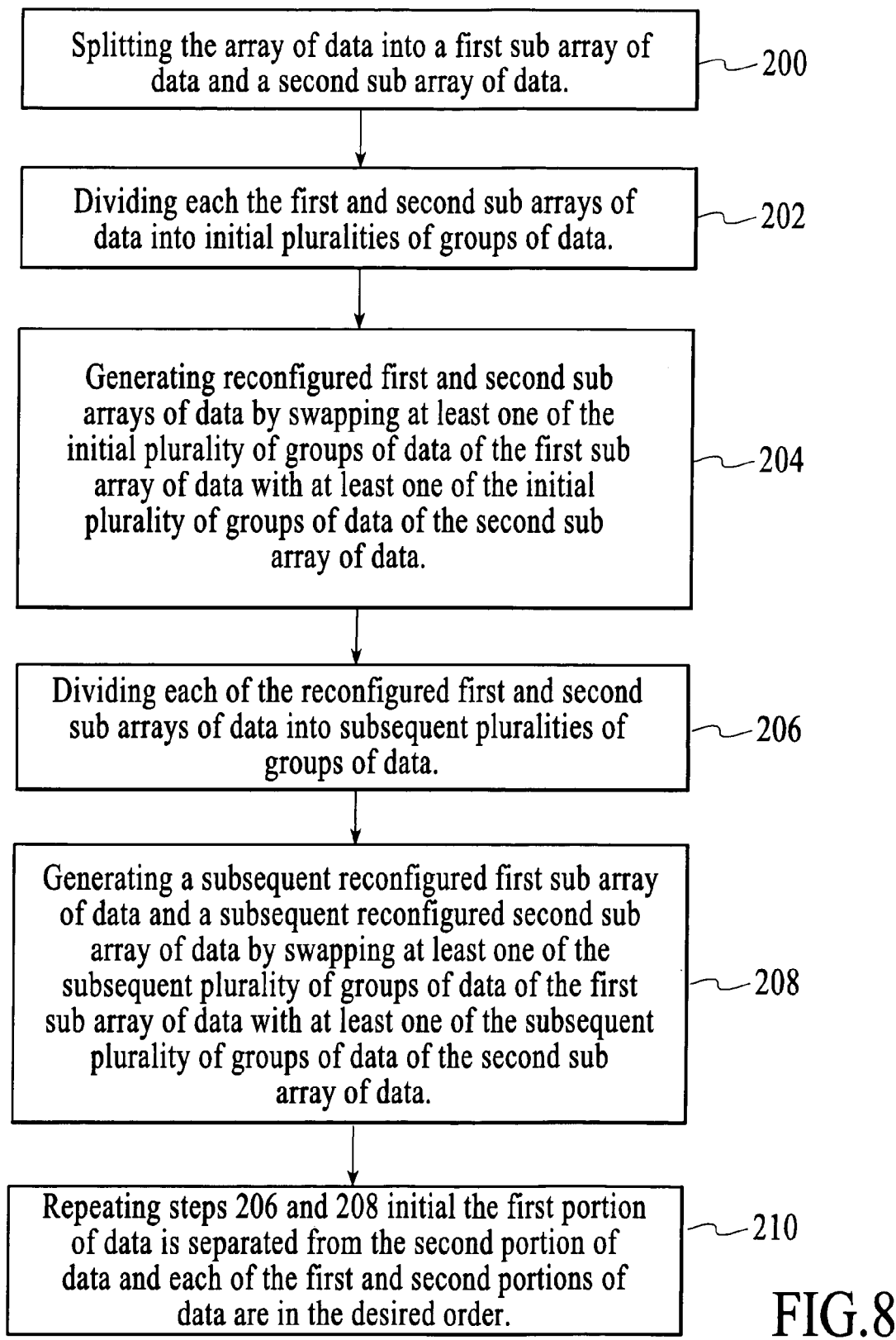
FIG. 8 is a flowchart of the swapping operation of the method in accordance with the present invention.

To further understand the recursive swapping operation of the method in accordance with the present invention, please refer to the flowchart of FIG. 8. First, an array of data is split into a first sub array of data and a second sub array of data, via step 200. Next, each of the first and second sub arrays of data are divided into initial pluralities of groups of data, via step 202. Reconfigured first and second sub arrays of data are then generated by swapping at least one of the initial plurality of groups of data of the first sub array of data with at least one of the initial plurality of groups of data of the second sub array of data, via step 204. Next, each of the reconfigured first and second sub arrays of data are divided into subsequent pluralities of groups of data, via step 206.

Next, a subsequent reconfigured first sub array of data and a subsequent reconfigured second sub array of data are generated by swapping at least one of the subsequent plurality of groups of data of the first sub array of data with at least one of the subsequent plurality of groups of data of the second sub array of data, via step 208. Finally, steps 206 and 208 are repeated until each of the first and second sub arrays of data are in the desired order, via step 210.

Figure 9:
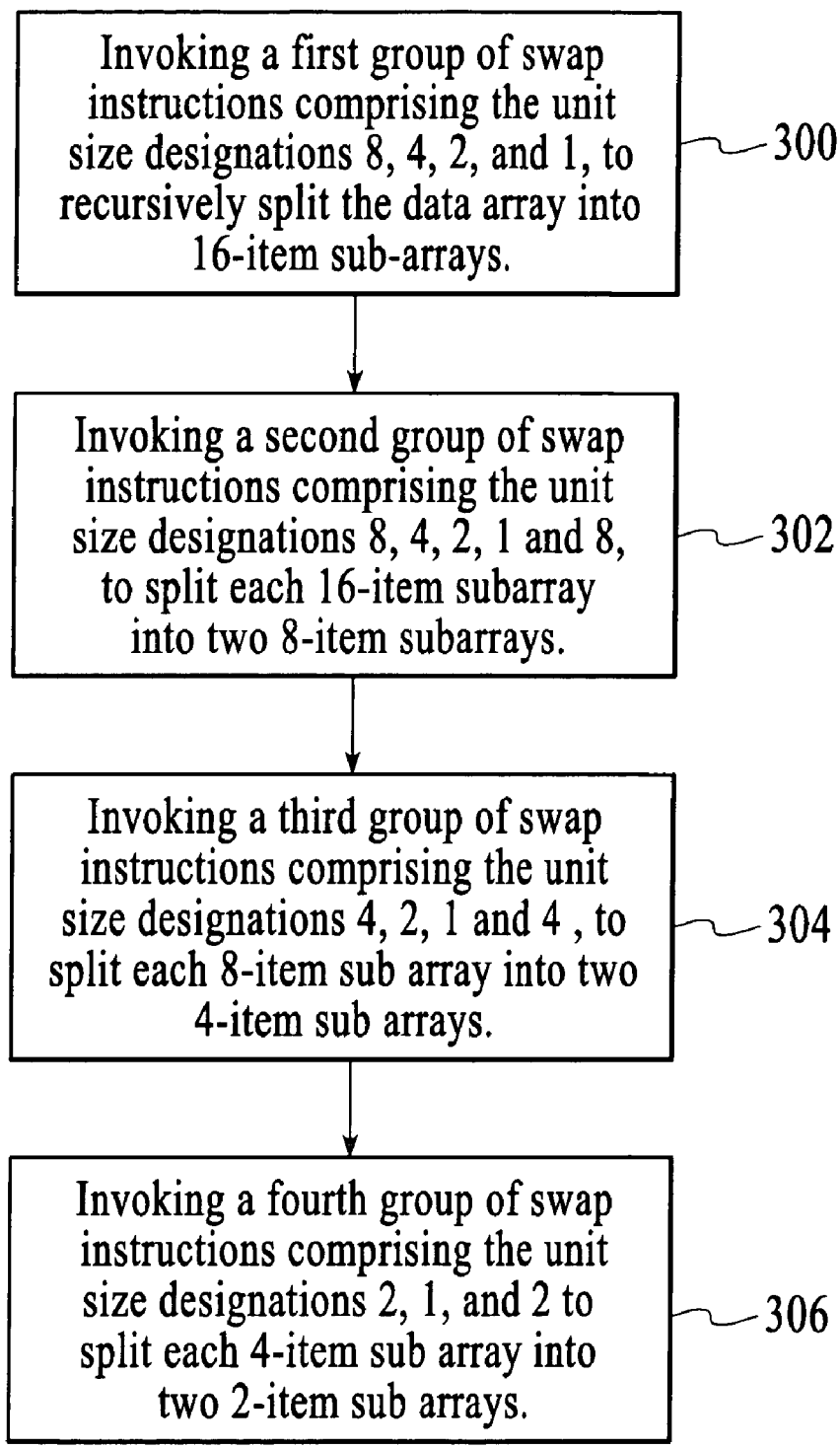
FIG. 9 is a flowchart of the preferred embodiment of the method in accordance with the present invention.

For an example of the operation of a preferred embodiment of the present invention, please refer now to FIG. 9. FIG. 9 is a flowchart of the preferred embodiment of the method in accordance with the present invention. Assuming the data array comprises 32 items in bit reverse order (see FIG. 9(a)), a first group of swap instructions is invoked comprising the unit size designations 8, 4, 2, 1, to split the data array into two 16-item sub-arrays, via step 300. FIG. 9(b) shows step 300. Preferably, step 300 is utilized when a data array is greater than 16 items (i.e. 32, 64, etc.). Next, a second group of swap instructions is invoked comprising the unit size designations 8, 4, 2, 1, 8 to split each 16-item sub arrays into 8-item sub arrays, via step 302. FIG. 9(c) shows step 302. A third group of swap instructions is then invoked comprising the unit size designations 4, 2, 1, 4 to split the 8-item sub arrays into 4-item sub arrays, via step 304. FIG. 9(d) shows step 304. Finally, a fourth group of swap instructions is invoked comprising the unit size designations 2, 1, 2 to get the final result, via step 306. FIG. 9(e) shows step 306 and the final result is illustrated in FIG. 9(f) wherein the array of data items are in natural order.

Although the preferred embodiment of the method and system in accordance with the present invention is described wherein the data array comprises 32 items and the final group of swap instructions comprise unit size designations 2, 1, 2, one of ordinary skill in the art will readily recognize that the algorithm can be implemented with any number of items and can be stopped after the completion of any group of swap instructions and still remain within the spirit and scope of the present invention.

Through the use of a method and system in accordance with the present invention, the conversion of the data array from bit reverse order to natural order is accomplished via a swapping algorithm. By utilizing the method in accordance with the present invention, the subsequent data arrays can be processed in a parallel fashion thereby increasing the overall processing speed of the computer system.

Although the present invention has been described in accordance with the embodiments shown, one of ordinary skill in the art will readily recognize that there could be variations to the embodiments and those variations would be within the spirit and scope of the present invention. Accordingly, many modifications may be made by one or ordinary skill in the art without departing from the spirit and scope of the appended claims.

What is claimed is:

1. A method of configuring an array of data comprising:
   a. Generating an array of data in an order; and
   b. Reconfiguring the array of data into a plurality of sub arrays of data, the plurality of sub arrays of data being in a desired order, wherein the reconfiguring step (b) further comprises:
      i. Utilizing at least one swap instruction;
      ii. Implementing a swapping operation based on the at least one swap instruction to recursively split the array of data into the plurality of subarrays of data until the desired order is reached, wherein the swapping operation operates on the data based on a unit size description and a write pattern; and
      iii. Wherein the unit size description determines a portion or the whole of the array of data to be swapped and the write pattern determines which units are to be swapped.

2. The method of claim 1 wherein the order comprises a bit reversed order and the desired order comprises a natural order.

3. The method of claim 1 wherein the order comprises a natural order and the desired order comprises a bit reversed order.

4. The method of claims 2 or 3 wherein the implementing step (b2) comprises:
   (b21) splitting the array of data into a first sub array of data and a second sub array of data;
   (b22) dividing each the first and second sub arrays of data into initial pluralities of groups of data;
   (b23) generating reconfigured first and second sub arrays of data by swapping at least one of the initial plurality of groups of data of the first sub array of data with at least one of the initial plurality of groups of data of the second sub array of data;
   (b24) dividing each of the reconfigured first and second sub arrays of data into subsequent pluralities of groups of data;
   (b25) generating a subsequent reconfigured first sub array of data and a subsequent reconfigured second sub array of data by swapping at least one of the subsequent plurality of groups of data of the first sub array of data with at least one of the subsequent plurality of groups of data of the second sub array of data; and
   (b26) repeating steps (b24) and (b25) until each of the first and second sub arrays of data are in the desired order.

5. A system of configuring an array of data comprising:
   a. Means for generating an array of data in an order; and
   b. Means for reconfiguring the array of data into a plurality of sub arrays of data, the plurality of sub arrays of data being in a desired order, wherein the reconfiguring means further comprises:
      i. Means for utilizing at least one swap instruction;
      ii. Means for implementing a swapping operation based on the at least one swap instruction to recursively split the array of data into the plurality of sub arrays of data until the desired order is reached, wherein the swapping operation operates on the data based on a unit size description and a write pattern; and
      iii. Wherein the unit size description determines a portion or the whole of the array of data to be swapped and the write pattern determines which units are to be swapped.

6. The system of claim 5 wherein the at least one swap instruction comprises a plurality of swap instructions.

7. The system of claim 6 wherein the order comprises a bit reversed order and the desired order comprises a natural order.

8. The system of claim 7 wherein the order comprises a natural order and the desired order comprises a bit reversed order.

9. The system of claims 7 or 8 wherein the utilizing means comprises:
   means for splitting the array of data into a first sub array of data and a second sub array of data;
   means for dividing each the first and second sub arrays of data into initial pluralities of groups of data;
   means for generating reconfigured first and second sub arrays of data by swapping at least one of the initial plurality of groups of data of the first sub array of data with at least one of the initial plurality of groups of data of the second sub array of data;
   means for dividing each of the reconfigured first and second sub arrays of data into subsequent pluralities of groups of data;
   means for generating a subsequent reconfigured first sub array of data and a subsequent reconfigured second sub array of data by swapping at least one of the subsequent plurality of groups of data of the first sub array of data with at least one of the subsequent plurality of groups of data of the second sub array of data; and
   means for placing each of the first and second sub arrays of data in the desired order.

* * * * *